UNITED STATES PATENT OFFICE.

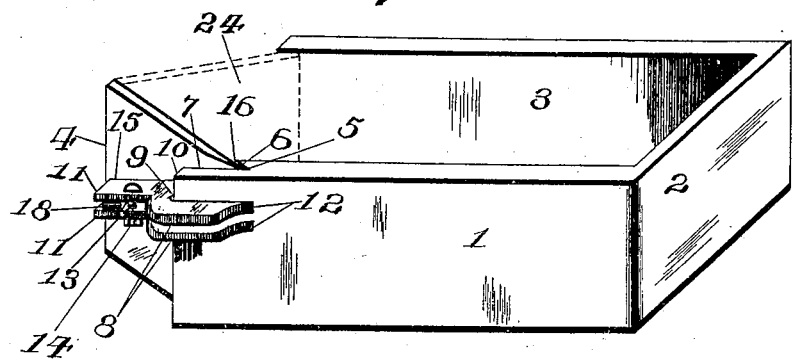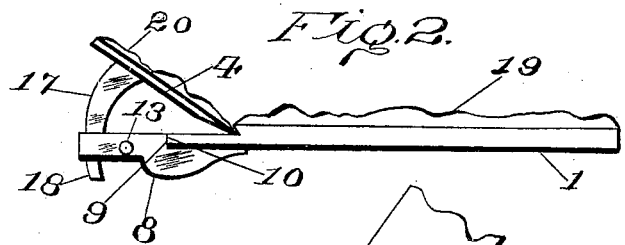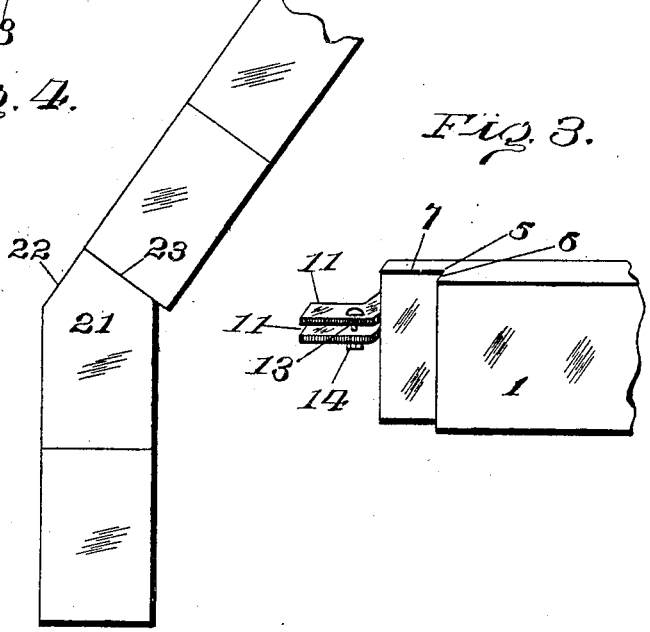

WILLIS H. McDOWELL, OF AUBURN, INDIANA.

MOLDING APPARATUS.

No. 813,572. Specification of Letters Patent. Patented Feb. 27, 1906.

Application filed May 12, 1905. Serial No. 260,113.

*To all whom it may concern:*

Be it known that I, WILLIS H. McDOWELL, a citizen of the United States, residing at Auburn, in the county of Dekalb and State of Indiana, have invented new and useful Improvements in Molding Apparatus, of which the following is a specification.

My invention relates to molds for forming bricks, building-blocks, and the like, consisting of ordinary brick material or other plastic substance capable of being shaped by a mold.

The object of the invention is the production of a mold capable of forming what is known in the trade as "angle" bricks or blocks, such bricks or blocks having generally one end rectangular and the other end wedge-shaped and being specially adapted for making the joint in a structure where an angle in the wall is desired, such as bay-windows and the like.

Another object of the invention is to produce a mold which shall be adapted to form angle bricks or blocks having varying angles to conform to the angle desired in the walls of any particular structure.

It is well known that difficulty is experienced in forming an angle of definite degree in a wall where ordinary rectangular bricks or blocks are used, due to the necessary cutting and shaping of such bricks or blocks before they can be made to form just the angle desired, and even when so manipulated the joint produced is often unsightly and unstable. The brick or block produced by my invention avoids these serious objections in that such production can be made with a great variety of angles and with the faces forming the angle of varying length.

The invention will first be described in connection with the accompanying drawings and then pointed out in the claims.

In the drawings, Figure 1 is a perspective of my improved mold. Fig. 2 is a top plan of two sides of the mold. Fig. 3 is a broken perspective of one side of the mold, illustrating particularly the coöperating means for swinging one of the sides. Fig. 4 is a plan of part of one tier of bricks forming the angle in a wall or the like, one of the bricks being shown as formed in my improved mold.

Referring to the drawings, in which like parts throughout the several views are indicated by like numerals, the mold is shown as formed of sides 1 and 3 and ends 2 and 4. In the inner face of side 1, extending from one end a short distance toward the other, a shoulder 5 is cut, one wall 6 of which is formed at an acute angle to the other wall 7 for the purpose hereinafter described. Formed integral with side 1 on the same end as shoulder 5, but on the opposite face, is a pair of clamping-plates 8, formed with two arms 11 and 12 and shoulders 9, which abut end 10 of side 1. The free arms 11 of these plates, which project from end 10 of side 1, are spaced a short distance apart and are capable of slight movement toward and away from each other through the medium of a screw-bolt 13 and coöperating nut 14, the edge 15 of said plates being in the same vertical plane as wall 7 of shoulder 5.

End 4 of the mold, which is of less thickness and length and seven-eighths of the height of sides 1 and 3, is tapered to an edge 16, said edge fitting into the acute angle of shoulder 5, which thus forms a socket to fulcrum side 4, the edge 16 of course acting as a bearing edge.

Fixedly secured to, or, if preferred, formed integral with side 4 is a curved arm 17 of such thickness that end 18 will pass loosely between arms 11 of clamping-plates 8 when they lie their normal distance apart and free of tension from bolt 13.

In Fig. 2 the inner faces of sides 1 and 4 are shown as formed with corrugations 19 and 20, respectively, used in molding imitation rock, stone, or the like.

In Fig. 4 is shown an angle-block 21, such as is capable of being formed by my mold, serving as an angle of the wall structure of a bay-window or the like. It will be observed that the faces 22 and 23 are made of unequal length, which result is readily accomplished by my mold by using a board of proper length to form face 23, such board 24 being shown in dotted lines in Fig. 1.

The operation of the mold is as follows: The proper angle required in the brick or block being known the side 4 is swung in shoulder 5 to such angle, the arm 17 sliding between the arms 11 of clamping-plate 8, when nut 14 is turned to draw the arms 11 toward each other sufficiently to tightly clamp and hold between them arm 17, thus securely holding side 4 in proper fixed relation to side 1. Cement or other plastic material is now poured into the mold, packed, and allowed to partially set, when it is removed and dried.

Having described my invention, what I claim as new, and desire to secure by Letters Patent, is—

1. A mold having one side formed with a recess, the edge of the adjacent end being beveled to loosely seat in the said recess, and means to adjust said latter end.

2. A mold having one side reduced at the end to provide a transversely-arranged shoulder, the adjacent end having one edge beveled to bear against said shoulder and means to adjust said end.

3. A mold having one side formed with a recess and provided with clamping-arms, the adjacent end of the mold being beveled to seat in said recess, and an arm projecting from said end and normally held between the clamping-arms.

4. A mold having one side formed with a recess and provided with clamping-arms, the adjacent end of the mold being beveled to seat in said recess, an arm projecting from said end and normally held between the clamping-arms, and means for adjusting said clamping-arms.

In testimony whereof I affix my signature in presence of two subscribing witnesses.

WILLIS H. McDOWELL.

Witnesses:
J. W. MILLER,
IRA M. THRUSH.